United States Patent [19]
Woodhouse

[11] Patent Number: 6,000,373
[45] Date of Patent: Dec. 14, 1999

[54] ENGINE LUBRICATION SYSTEM

[75] Inventor: Timothy C. Woodhouse, Bucks, United Kingdom

[73] Assignee: Stephen Ronald Tickner (a part interest), Studham, United Kingdom

[21] Appl. No.: 09/068,165
[22] PCT Filed: Nov. 6, 1996
[86] PCT No.: PCT/GB96/02713
  § 371 Date: Jul. 7, 1998
  § 102(e) Date: Jul. 7, 1998
[87] PCT Pub. No.: WO97/17530
  PCT Pub. Date: Mar. 15, 1997

[30] Foreign Application Priority Data

Nov. 9, 1995 [GB] United Kingdom .................... 9522975

[51] Int. Cl.[6] .......................................................... F01M 1/12
[52] U.S. Cl. ................................... 123/196 R; 123/90.33; 123/196 M; 184/6.9; 184/11.5
[58] Field of Search ............................... 123/90.33, 90.34, 123/196 M, 196 R, 196 AB; 184/6.5, 6.9, 6.28, 11.5

[56] References Cited

U.S. PATENT DOCUMENTS

| | | |
|---|---|---|
| 1,847,418 | 3/1932 | Steedman . |
| 4,122,818 | 10/1978 | Hattori .............................. 123/196 AB |
| 4,204,487 | 5/1980 | Jones ................................. 123/196 AB |

FOREIGN PATENT DOCUMENTS

| | | |
|---|---|---|
| 1 161 781 | 9/1958 | France . |
| 12 86 517 | 5/1969 | Germany . |
| 91 09 130 | 9/1991 | Germany . |
| 166766 | 7/1921 | United Kingdom . |

Primary Examiner—Willis R. Wolfe
Assistant Examiner—Brian J. Hairston
Attorney, Agent, or Firm—Watson Cole Grindle Watson, P.L.L.C.

[57] ABSTRACT

The invention provides, in one aspect, a lubrication system for internal combustion engines of the kind comprising a crankshaft (1) and an associated oil sump (3), a camshaft in a cylinder head above the oil sump, and a timing belt (5) connecting the crankshaft and camshaft via respective, pulleys (2, 4). In accordance with the invention, the timing belt is adapted to entrain a sufficient quantity of oil from the oil sump to lift it to the cylinder head for lubricating purposes, thereby eliminating the need for a separate oil pump. Preferably, an oil pulley (7) is provided below the crankshaft pulley (2) positioned to be immersed in oil within the oil sump for entraining oil therefrom. In one form, in which the crankshaft and camshaft pulleys (2, 4) have similarly formed tooth sets of different diameters to effect the timing required, the timing belt (5) is of an impermeable material over its width and is formed with a set of teeth (6) around its inner face meshing with said toothed pulleys, the oil pulley also has a tooth set (8), and the timing belt has an additional set of teeth (9) extending around its outer face for meshing with the teeth of the oil pulley, said outer teeth providing the means for entraining oil to the cylinder head. In another aspect of the invention, an engine lubrication system is provided wherein a toothed pulley (2 or 4), is provided, the teeth (32, 36) of which run over a part of their rotation in a restricted passage provided by a casing (10) and a belt (5) having mating teeth also runs for part of its movement in a restricted passage provided by said casing, these runs being guided to a meeting point (33, 35) at which oil under pressure is available as a result of meshing action of the two sets of teeth.

8 Claims, 6 Drawing Sheets

ENGINE LUBRICATION SYSTEM

BACKGROUND AND SUMMARY OF THE INVENTION

This invention relates to lubrication systems for internal combustion engines. Such engines have been established for over 100 years, and there has been no fundamental change to their lubrication system over the years. Thus, it is traditional to provide an oil lubrication system in which a separate oil pump is provided for circulating the oil to the various moving parts thereof.

An object of the invention is to provide a lubrication system in which oil is circulated without the need for a separate oil pump.

According to the invention, in an internal combustion engine including a crankshaft and an associated oil sump, a camshaft in a cylinder head above the oil sump, and a timing belt connecting these shafts via respective pulleys, the timing belt is adapted to entrain a sufficient quantity of oil from the oil sump to lift it to the cylinder head for lubricating purposes.

Conveniently, oil is returned to the sump via an oil cooler, to enable the entrained oil to be used additionally for cooling purposes.

As known per se, the camshaft and crankshaft pulleys have similarly formed tooth sets, but are of different diameters to effect the timing required, and the timing belt is of an impermeable material over its width and formed with a set of teeth around its inner face for meshing with said toothed pulleys.

In accordance with a feature of the invention, an additional oil pulley is provided immersed in oil within the oil sump, and below the level of the crankshaft pulley, the oil pulley also being toothed and the timing belt having an additional set of teeth extending around its outer face for meshing with the teeth of the oil pulley, said outer teeth providing the means for entraining oil to the cylinder head.

In one form, the additional set of teeth may be formed with scoops for entraining the oil.

Preferably, the additional teeth are designed to run closely within a closed passage, whereby they act with the wall of the passage to entrap and entrain the oil.

According to another aspect of this invention an engine lubrication system includes a toothed pulley, the teeth of which run over a part of the rotation within a restricted passage and a belt having matching teeth which also runs for part of its movement within a restricted passage, these runs being guided to a meshing point at which oil under pressure as a result of the meshing action is available.

BRIEF DESCRIPTION OF THE DRAWINGS

In order that the invention may be readily understood, one preferred embodiment and a modification thereof will now be described with reference to the accompanying drawings, in which.

DETAILED DESCRIPTION OF THE PREFERRED EMBODIMENTS

Figure 1:
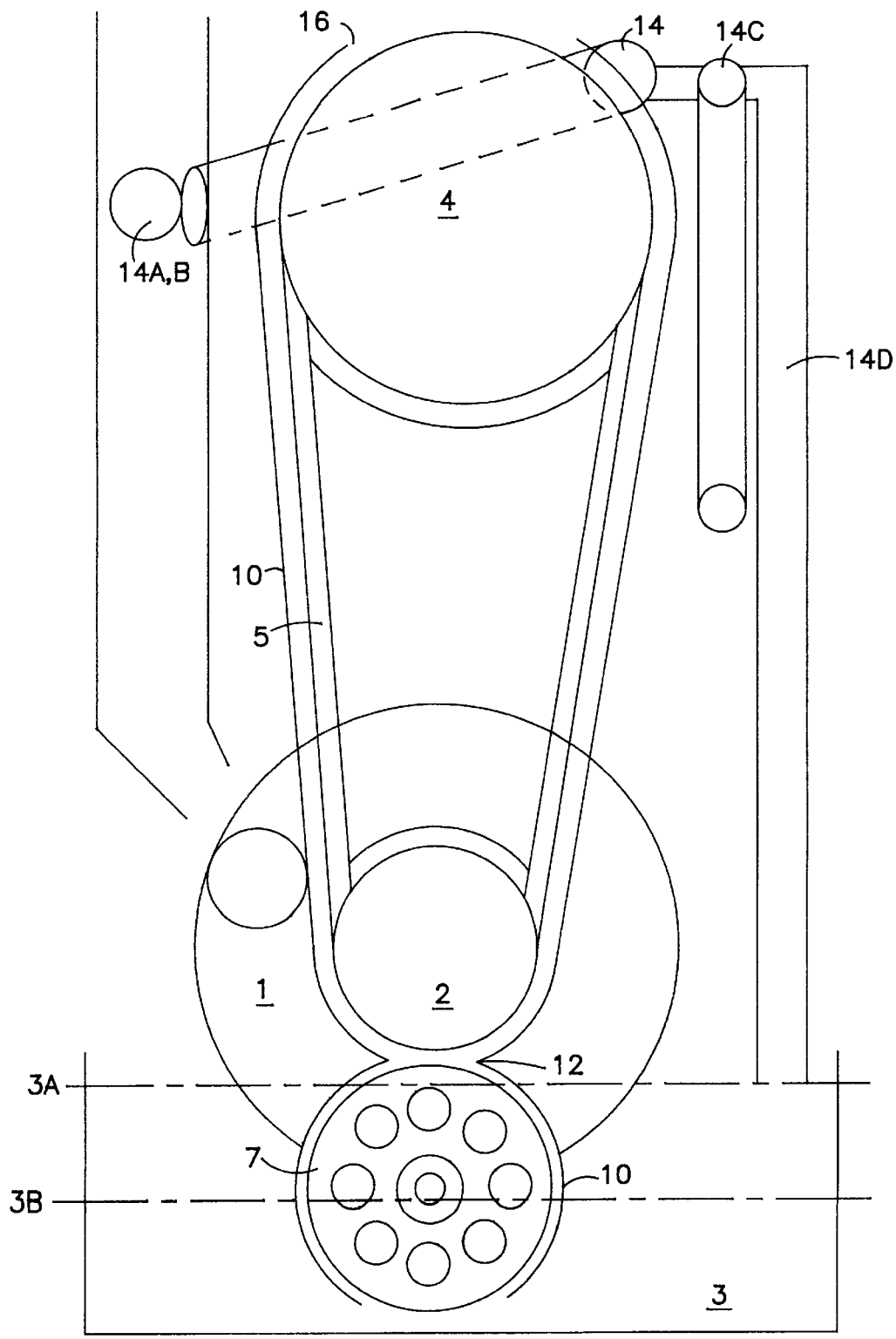
FIG. 1 is a diagrammatic cross-section showing the timing/lubrication arrangement.

Referring to FIG. 1, a preferred timing/lubrication arrangement includes the crankshaft 1 having a toothed pulley 2. The axis of the crankshaft, and hence the pulley, is located immediately above an oil sump 3, the oil level of which is indicated at 3A when stopped, and 3B when running. As known per se, the pulley 2 is connected to a larger diameter, toothed pulley 4 connected to the camshaft (not shown) by a timing belt 5; the tooth profile size of the teeth of each pulley 2, 4 is substantially the same, but there is a different number of teeth on each pulley, to produce the difference in rotation required between the crankshaft and camshaft for timing.

Figure 2:
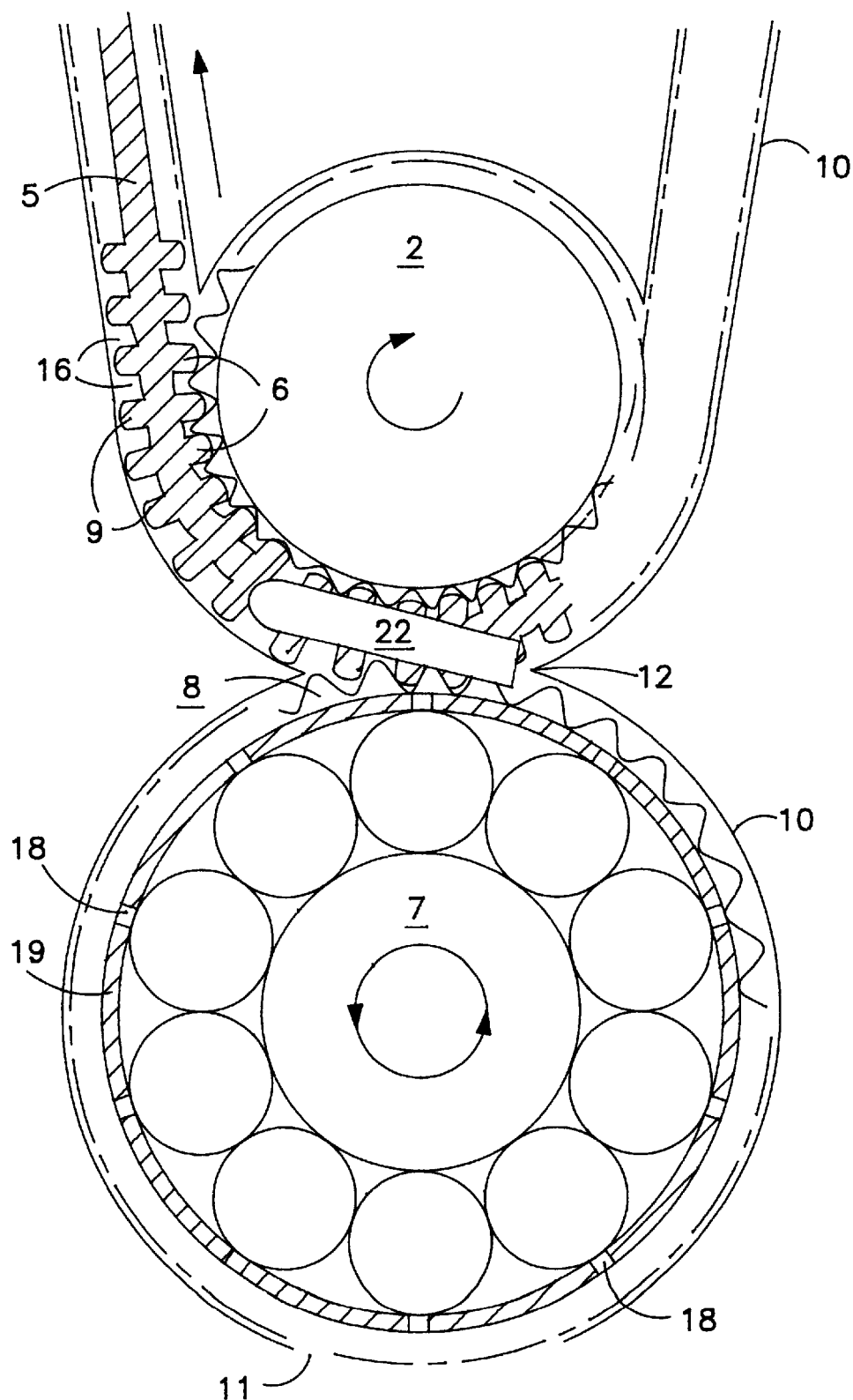
FIG. 2 is an enlarged cross-section of part of FIG. 1.
Figure 3:
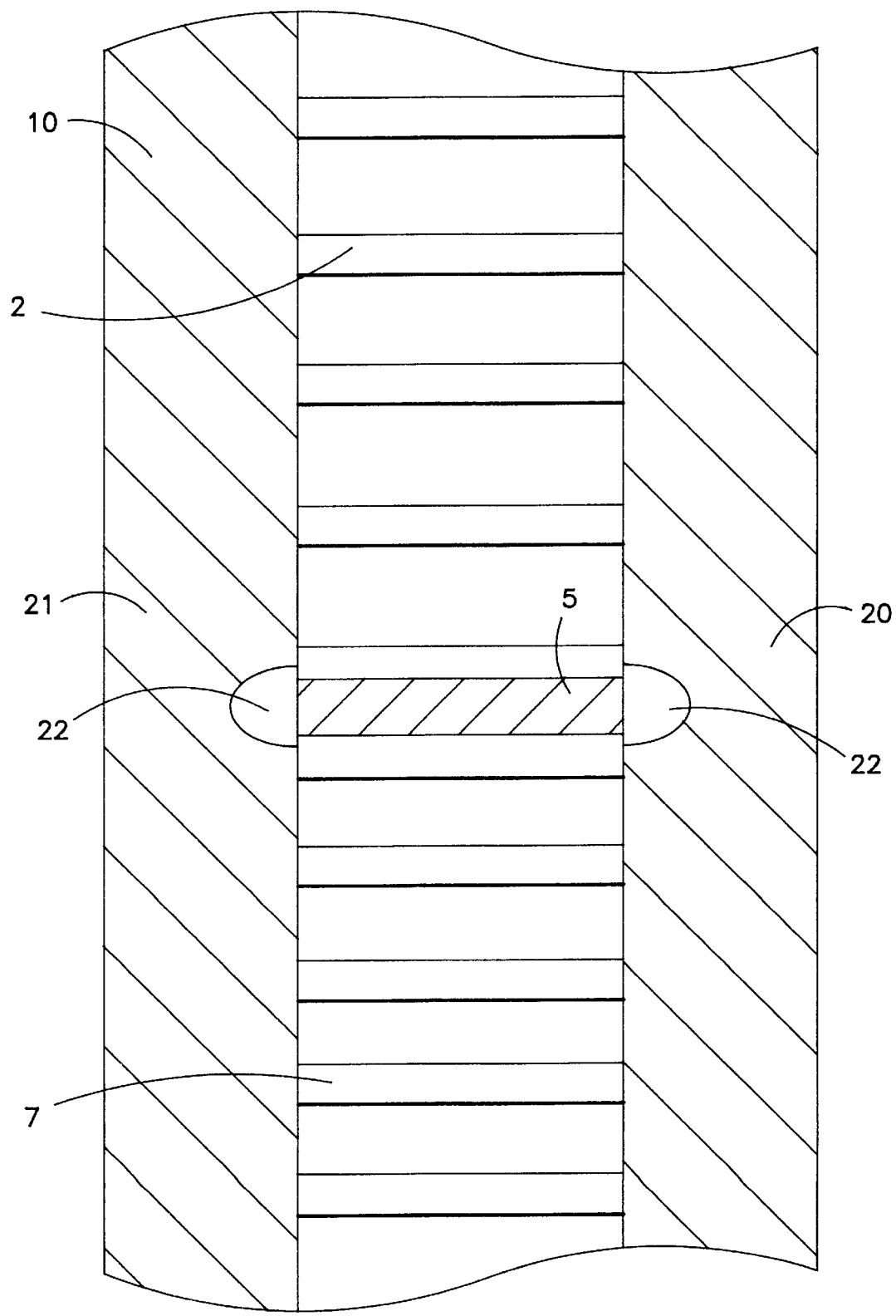
FIG. 3 is a side view of the part shown in FIG. 2.

Referring also to FIGS. 2 and 3, as known per se, the timing belt 5 is of a flexible, impervious material, with a set of teeth 6 running around its inner face for meshing with the teeth of both pulleys 2, 4. In accordance with the invention, a further, toothed, oil pulley 7 is provided which extends below the running oil level 3B to be continuously immersed. The oil pulley is located immediately beneath the crankshaft pulley 2 and its teeth 8 are adapted to engage and be driven by a further set of teeth 9 running around the outer face of the timing bell 5. As shown particularly in FIG. 2, the timing belt 5 and pulleys 2, 4 and 7 are enclosed within a waisted casing 10, the lower end providing a mouth 11 in the sump 3, the waist 12 defining the area where meshing takes place with the pulleys 2 and 7, and the upper end providing an outlet 13 (see FIG. 4) to an oil gallery 14 in the cylinder head 15 as discussed below. It will be noted that the casing 10 provides a closed path 16 at least for the upward run of the timing belt, and the teeth 9 of the belt move closely within this passage.

The oil pulley has a series of openended pick-up ports 17 disposed circumferentially, each with a radial transfer port 18 extending through its outer wall 19, and the front and rear walls 20, 21 of the casing 10, see FIG. 3, define ports 22 adjacent the meshing area of the pulleys and belt 2, 7, 5.

Figure 4:
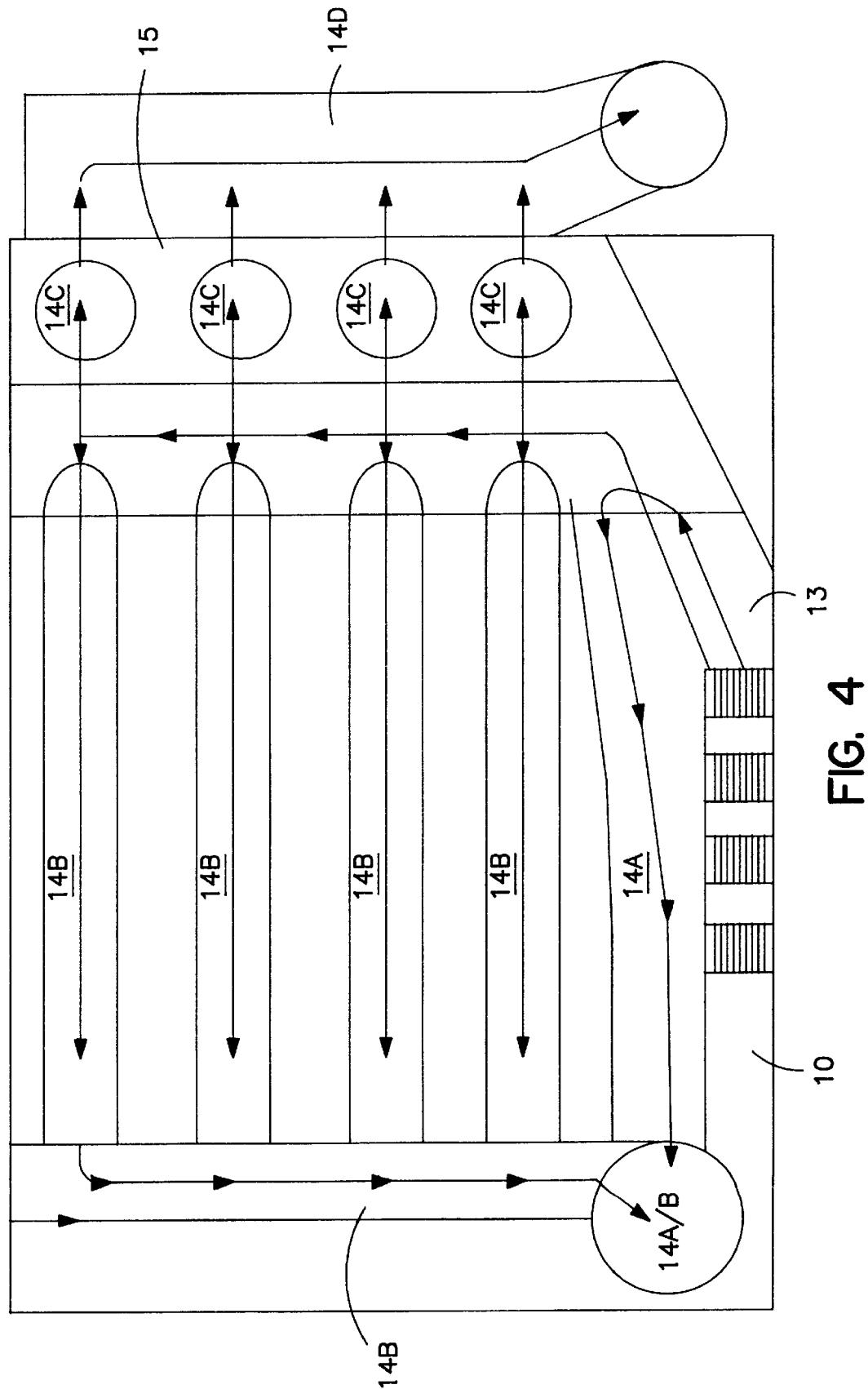
FIG. 4 is a top plan view of the cylinder head.

Referring to FIG. 4, and also to FIG. 1, the cylinder head 15 is provided with an oil gallery 14 which is fed from the outlet 13 of the casing 10. The gallery includes a branch 14A for feed to the crankshaft big end, branches 14B for the cylinders and return via the branch 14A/B to the big end, branch 14C for ancillary equipment such as the engine valves and associated tappets, and a branch 14D for overflow back to the oil sump 3.

In use, oil from sump 3 is picked up in the oil pulley main pick-up ports 17, and to a certain extent by the oil pulley driven teeth 8. On rotation of the oil pulley 7, oil is carried to its meshing area with crankshaft pulley 2. At this point, the teeth 9 of the timing belt 5 block oil progress. Consequently, the oil is then forced through the ports 22 by its own inertia and a squashing action of the toothed timing belt engaging with the oil pulley. Oil from the oil pulley pick-up ports 17 flows out of the transfer ports 18 effectively formed between the oil pulley teeth 8, before and after meshing with the teeth 9 of the timing belt. Consequently, the outside run of this belt is filled not only with oil from the ports 22, but also by centrifugal force acting on the oil as a result of the meshing action with the oil pulley. When oil has been transferred to the outside run of the belt, it is thus forcibly lifted through the closed passage 16 to the outlet 13 in the cylinder head 15. At this point, oil under pressure is then directed, as required, through the oil gallery 14 for the purpose of lubrication and, in the case where an oil cooler is included in the system, also for cooling. When the cooling and lubrication functions are complete, oil is returned to the sump 3 via the branches 14A, 14C and 14D.

For a cold start, the big end bearing is lubricated by splash for the short time it takes for oil pumped via the timing belt 5, to reach it. With a cold engine, initially most of the oil is returned to the sump 3 via the overflow 14D. As the cylinder head 15 and cylinders warrn up, the oil's viscosity drops and circulation is progressively stepped up. Until normal temperature is reached the big end bearing still receives a degree of splash lubrication. When normal running temperature is reached the crankshaft runs substantially free of oil drag and lubrication is supplied entirely by the pump arrangement the hotter the oil the quicker its circulation.

When the engine has reached normal operating temperature, the overflow 14D will only be in use at speeds over tickover or idle. This is so that full cooling capacity is available for heavy traffic conditions at low engine speeds.

It will be appreciated that air breathers 24 can be provided at appropriate locations. For emission requirements, these breathers will preferably be connected to an engine intake cleaner, so as to eliminate air pollution by burning fumes from the engine.

Figure 5:
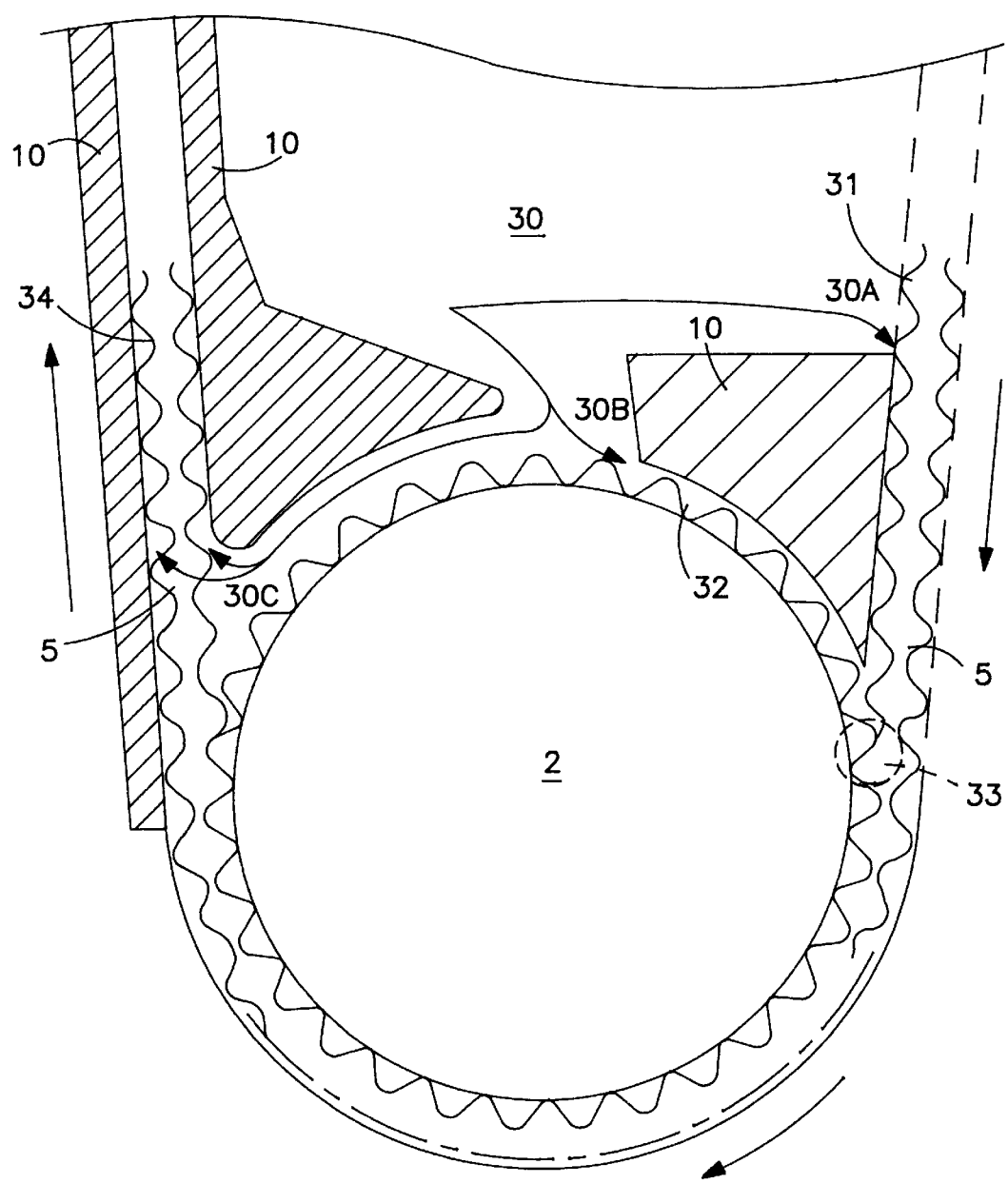
FIG. 5 is an enlarged cross-section of the lower half of the modified arrangement.
Figure 6:
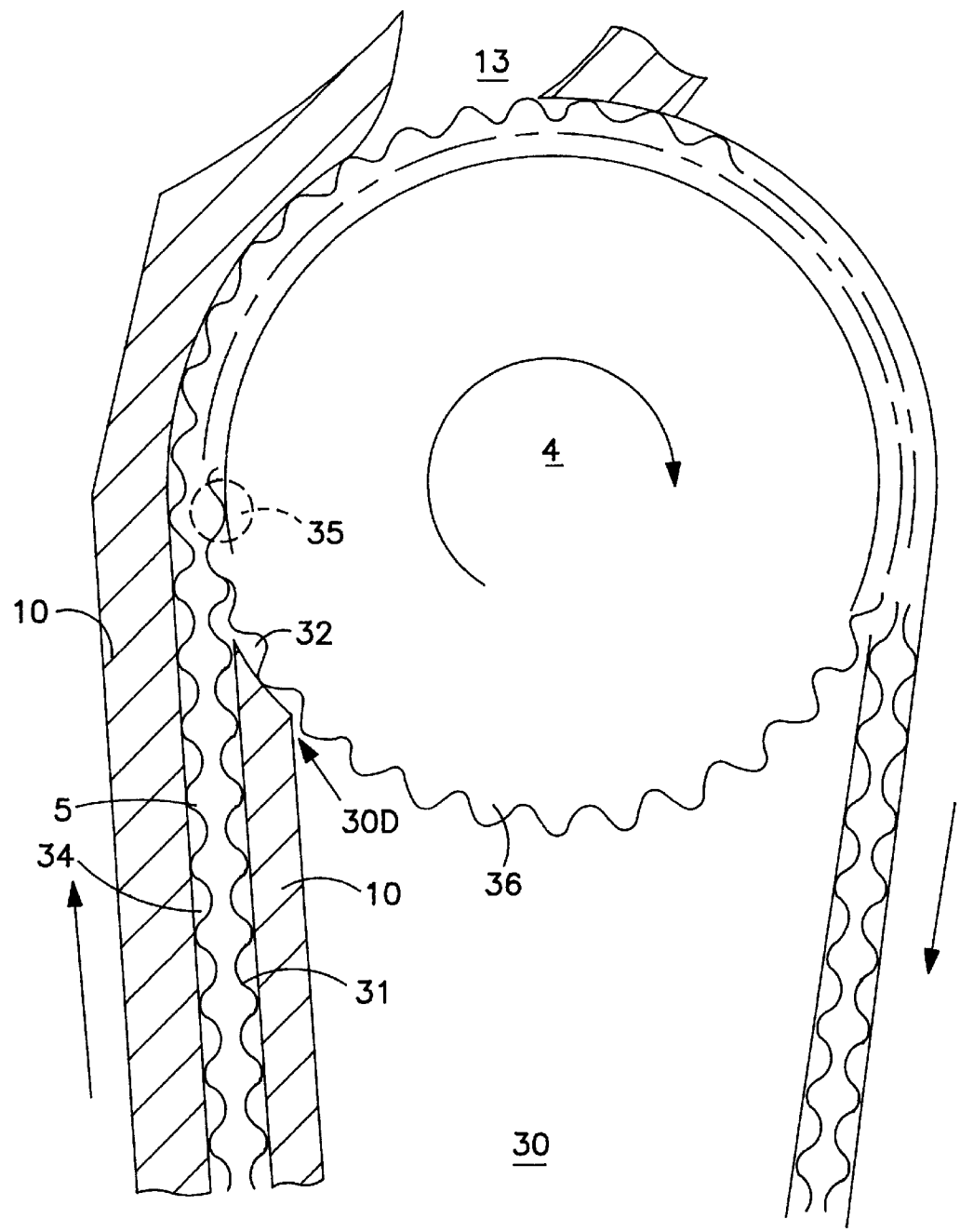
FIG. 6 is an enlarged cross-section of the upper half of the modified arrangement.

Referring to FIGS. 5 and 6, in a modification of the arrangement described above, the casing 10 defines a reservoir 30 above the timing pulley 2 to which oil can be fed from the oil sump, and/or be collected as recovered oil from the cylinder head e.g. via the branch 14C (see FIG. 1). Oil is fed from the reservoir, in this embodiment to three locations as shown by the arrows 30A, B and C.

With regard to the downward movement of the pulley 2, as shown to the right of FIG. 5, it will be noted that oil fed via location 30A primes the toothed inner run 31 of the timing belt 5, which is restricted by casing 10 over part of its rotation, whilst that fed through location 30B is fed via a restricted run 32 towards the teeth of the pulley 2. In operation these two restricted oil feeds are respectively guided towards a meshing point at which an outlet 33 is provided. It will be appreciated that the meshing action compresses the oil, which is forced out of the outlet under pressure, and can therefore be used for appropriate additional functions, e.g. crankshaft, or gearbox lubrication; initial testing has shown that pressures in the region of 30 PSI can be achieved.

With regard to upward movement of the pulley 2, as shown to the left of FIG. 5, oil is fed at location 30C to both the inner run 31 and outer run 34 of the belt 5 and is entrained between these runs and the casing 10 and guided upwardly towards the cylinder head.

Referring now to FIG. 5, a further outlet 35 may be provided, if required, where the inner run 31 meshes with the teeth 36 of the camshaft pulley 4; thus, in a similar manner as described above, oil can be fed to a further location 30D where it is entrained between the teeth 36 and casing 10 to provide a further pressurised oil source via the outlet 35 for additional lubrication purposes. Thereafter, the oil left entrained between the belt 5 and casing 10, is fed via the outlet 13 to the oil gallery of the cylinder head as described hereinbefore.

It will be appreciated that the system and modification described above have the following advantages:
1. drives and times the camshaft
2. pumps oil to the cylinder head
3. delivers oil to the big end bearing
4. delivers oil to the main bearings
5. delivers oil to the camshaft
6. delivers oil to the camshaft bearings
7. delivers oil through oil galleries and cooling ducts
8. delivers oil if required to the gearbox
9. the oil takes heat from the cylinder head and/or cylinder and returns it to the sump, by way of various components that are lubricated on the oil's return
10. acts as an oil pump and a coolant pump 11. the oil effectively damps out mechanical noise to a very large extent, the integrated cam drive, lubrication and cooling system effectively formed being extremely quiet in operation.
12. significant gains in torque, acceleration and horse power, significant reductions in noise, cost and lost power with full lubrication of vulnerable parts on cold start up.

I claim:

1. An internal combustion engine comprising: a crankshaft (1); an oil sump (3) associated with the crankshaft; a cylinder head (15) above the oil sump; a camshaft mounted on the cylinder head; a crankshaft pulley (2) connected to the crankshaft; a camshaft pulley (4) connected to the camshaft; drive means (5) in driving engagement with the crankshaft pulley and with the camshaft pulley whereby, in use, rotation of the crankshaft causes corresponding rotation of the camshaft; and oil supply means (7) for supplying oil from the sump to the drive means adjacent the crankshaft pulley, wherein the oil supply means (7) supplies oil to the drive means (5) throughout the operating speed range of the engine; guide means (13) are provided on the cylinder head (15) for guiding oil from a region of the camshaft pulley (4) to areas where lubrication is required; the drive means (5) being a timing belt adapted to entrain and carry to the cylinder head (15) sufficient oil to lubricate cylinder head components.

2. An internal combustion engine according to claim 1, wherein the oil supply means comprises an oil pulley (7) below the crankshaft pulley (2) and in part immersed in oil within the oil sump (3), the oil pulley (7) being rotated in use to transfer oil from the sump (3) to the timing belt (5).

3. An internal combustion engine according to claim 2, wherein the crankshaft pulley (2) and the camshaft pulley (5) have similarly formed teeth sets of different diameters to effect the timing required, the timing belt (5) being of an impermeable material over its width and being formed with a set of teeth around its inner face (31) for meshing with the crankshaft and camshaft pulleys, the oil pulley (7) also being toothed and the timing belt having an additional set of teeth extending around its outer face (34) for meshing with the teeth of the oil pulley (7), the outer teeth providing means for carrying oil to the cylinder head.

4. An internal combustion engine according to claim 2, wherein the teeth of the said additional set of teeth are formed with scoops for entraining oil.

5. An internal combustion engine according to claim 4, wherein said additional teeth run within a closed passage whereby they act with the wall of said passage to entrap and entrain oil.

6. An internal combustion engine according to claim 5, including a return line for returning oil from the cylinder head to the sump and a cooler in the return line.

7. An internal combustion engine according to claim 2, wherein the teeth of the crankshaft pulley (2) and the teeth of the timing belt (5), in regions approaching the point of meshing of the teeth, run in respective restrictive passages, and means are provided for supplying oil to the restricted passages whereby oil displaced from between the teeth as the teeth come into mesh is available as oil under pressure.

8. An engine lubrication system including a toothed pulley, the teeth of which run over a part of the rotation within a restricted passage and a belt having mating teeth which also run for part of their movement within a restricted passage, said teeth and mating teeth being guided to a meshing point at which oil under pressure is provided.

* * * * *